United States Patent
Selby et al.

(10) Patent No.: US 12,444,526 B2
(45) Date of Patent: Oct. 14, 2025

(54) METHODS OF DYNAMIC MECHANICAL ANALYSIS USING NUCLEAR MAGNETIC RESONANCE

(71) Applicants: William Selby, Fredericton (CA); Igor Mastikhin, Fredericton (CA); Phil Garland, Fredericton (CA)

(72) Inventors: William Selby, Fredericton (CA); Igor Mastikhin, Fredericton (CA); Phil Garland, Fredericton (CA)

(73) Assignee: THE UNIVERSITY OF NEW BRUNSWICK, Fredericton (CA)

( * ) Notice: Subject to any disclaimer, the term of this patent is extended or adjusted under 35 U.S.C. 154(b) by 175 days.

(21) Appl. No.: 18/129,564

(22) Filed: Mar. 31, 2023

(65) Prior Publication Data

US 2024/0331908 A1    Oct. 3, 2024

(51) Int. Cl.
  *G01V 3/00*    (2006.01)
  *G01R 33/383*    (2006.01)
  *H01F 7/02*    (2006.01)

(52) U.S. Cl.
  CPC ......... *H01F 7/0278* (2013.01); *G01R 33/383* (2013.01)

(58) Field of Classification Search
  CPC .......................... G01R 33/383; H01F 7/0278
  See application file for complete search history.

(56) References Cited

U.S. PATENT DOCUMENTS

| 8,727,998 B2 | 5/2014 | Yin et al. | |
| 2009/0128272 A1* | 5/2009 | Hills | G01R 33/383 335/306 |
| 2016/0174868 A1* | 6/2016 | Tarasek | A61B 5/0051 600/411 |
| 2016/0349345 A1* | 12/2016 | Park | A61B 5/11 |
| 2022/0196772 A1* | 6/2022 | Weidlich | G01R 33/56518 |
| 2022/0211272 A1* | 7/2022 | Krueger | G02B 23/26 |

(Continued)

OTHER PUBLICATIONS

S. K. Venkatesh, M. Yin, R. L. Ehman, Magnetic resonance elastography of liver: Technique, analysis, and clinical applications, Journal of Magnetic Resonance Imaging 37 (3) (2013) 544-555. doi:10.1002/jmri.23731.

(Continued)

*Primary Examiner* — Thang X Le
(74) *Attorney, Agent, or Firm* — Eugene Derenyi; Fogler, Rubinoff LLP

(57) ABSTRACT

Method of dynamic mechanical analysis of a sample including providing a magnet with a constant gradient where at least a portion of the sample is in the constant gradient, inducing a vibration in the sample in the direction of the constant gradient, the vibration comprising a vibration waveform and a vibration period, generating an NMR pulse sequence comprising at least two pulses with a delay between the pulses, acquiring echos from the pulse sequence at multiple points along the vibration period, measuring the phase of the NMR signal at each of the acquired echos, using the phase of the NMR signal to measure the velocity of the vibration at the multiple points where the echos are acquired, using the velocity measurements to acquire a velocity waveform, and using the velocity waveform and processing the velocity waveform to extract the loss angle and the magnitude of the dynamic modulus of the sample.

12 Claims, 10 Drawing Sheets

(56) References Cited

U.S. PATENT DOCUMENTS

2022/0221542 A1* 7/2022 Teh .................. G01R 33/56509

OTHER PUBLICATIONS

J. Ophir, I. Cespedes, H. Ponnekanti, Y. Yazdi, X. Li, Elastography: A quantitative method for imaging the elasticity of biological tissues, Ultrasonic Imaging 13 (2)(1991) 111-134. doi:https://doi.org/10.1016/0161-7346(91) 90079-W.

R. Muthupillai, D. J. Lomas, P. J. Rossman, J. F. Greenleaf, A. Manduca, R. L. Ehman, Magnetic resonance elastography by direct visualization of propagating acoustic strain waves, Science 269 (5232) (1995) 1854-1857. doi:10.1126/science.7569924.

H. Li, G. Fle, M. Bhatt, Z. Qu, S. Ghazavi, L. Yazdani, G. Bosio, I. Rafati, G. Cloutier, Viscoelasticity imaging of biological tissues and single cells using shear wave propagation. Frontiers in Physics 9 (2021). doi:10.3389/fphy.2021.666192.

B. Blumich, P. Blumler, G. Eidmann, A. Guthausen, R. Haken, U, Schmitz, K. Saito. G. Zimmer, The NMR-mouse: construction, excitation, and applications, Magnetic Resonance Imaging 16 (5-6) (1998) 479-484. doi:10.1016/s0730-725x(98)00069-1.

I. Mastikhin, M. Barnhill, Sensitization of a stray-field NMR to vibrations: A potential for MR elastometry with a portable NMR sensor, Journal of Magnetic Resonance 248 (2014) 1-7. doi:10.1016/j.jmr.2014.09.003.

C. S. Tan. A. E. Marble, Y. Ono, Magnetic resonance elastometry using a single-sided permanent magnet, Measurement Science and Technology 23 (4) (2012) 045703. doi:10.1088/0957-0233/23/4/045703.

J. C. Garcia-Naranjo, I. V. Mastikhin, B. G. Colpitts, B. J. Balcom, A unilateral magnet with an extended constant magnetic field gradient, Journal of Magnetic Resonance 207 (2) (2010) 337-344. doi:10.1016/j.jmr.2010.09.018.

H. T. Fabich, P. Nandi, H. Thomann, M. S. Conradi, Diffusion measurements using the second echo, Concepts in Magnetic Resonance Part A 47A (2018) e21462. doi:10.1002/cmr.a.21462.

T. Hall, M. Bilgen, M. Insana, T. Krouskop, Phantom materials for elastography, IEEE Transactions on Ultrasonics, Ferroelectrics and Frequency Control 44 (6) (1997) 1355-1365. doi:10.1109/58.656639.

R. A. Toupin, Saint-venant's principle, Archive for Rational Mechanics and Analysis 18 (2) (1965) 83-96. doi:10.1007/bf00282253.

E. E. Holly, S. K. Venkataraman, F. Chambon, H. H. Winter, Fourier transform mechanical spectroscopy of viscoelastic materials with transient structure, Journal of Non-Newtonian Fluid Mechanics 27 (1) (1988) 17-26. doi:10.1016/0377-0257(88)80002-8.

A. Y. Malkin, On the optimal form of a signal in fourier transform mechanical spectroscopy, Rheologica Acta 43 (1) (2004) 1-5. doi:10.1007/s00397-003-0310-2.

R. Pintelon, J. Schoukens, Real-time integration and differentiation of analog signals by means of digital filtering, IEEE Transactions on Instrumentation and Measurement 39 (6) (1990) 923-927. doi:10.1109/19.65799.

A. Brandt, R. Brincker, Integrating time signals in frequency domain—comparison with time domain integration, Measurement 58 (2014) 511-519. doi:10.1016/j.measurement.2014.09.004.

E.L. Hahn, Spin echoes, Phys. Rev. 80 (4) (1950) 580-594, https://doi.org/10.1103/physrev.80.580.

J. Stepišnik, Analysis of NMR self-diffusion measurements by a density matrix calculation, Physica B+C 104 (3) (1981) 350-364, https://doi.org/10.1016/0378-4363(81)90182-0.

K. Packer, The study of slow coherent molecular motion by pulsed nuclear magnetic resonance, Mol. Phys. 17 (4) (1969) 355-368, https://doi.org/10.1080/00268976900101131.

H.Y. Carr, E.M. Purcell, Effects of diffusion on free precession in nuclear magnetic resonance experiments, Phys. Rev. 94 (1954) 630-638, https://doi.org/10.1103/PhysRev.94.630.

* cited by examiner

```
┌─────────────────────────────────────────────────────────────────┐
│ Providing a magnet with a constant gradient where at least a    │
│ portion of the sample is in the constant gradient.              │
└─────────────────────────────────────────────────────────────────┘
                                ↓
┌─────────────────────────────────────────────────────────────────┐
│ Inducing a vibration in the sample in the direction of the      │
│ constant gradient, the vibration comprising a vibration         │
│ waveform and a vibration period.                                │
└─────────────────────────────────────────────────────────────────┘
                                ↓
┌─────────────────────────────────────────────────────────────────┐
│ Generating an NMR pulse sequence comprising at least two        │
│ pulses with a delay between the pulses.                         │
└─────────────────────────────────────────────────────────────────┘
                                ↓
┌─────────────────────────────────────────────────────────────────┐
│ Acquiring echos from the pulse sequence at multiple points      │
│ along the vibration period.                                     │
└─────────────────────────────────────────────────────────────────┘
                                ↓
┌─────────────────────────────────────────────────────────────────┐
│ Measuring the phase of the NMR signal at each of the acquired   │
│ echos.                                                          │
└─────────────────────────────────────────────────────────────────┘
                                ↓
┌─────────────────────────────────────────────────────────────────┐
│ Using the phase of the NMR signal to measure the velocity of    │
│ the vibration at the multiple points where the echos are        │
│ acquired.                                                       │
└─────────────────────────────────────────────────────────────────┘
                                ↓
┌─────────────────────────────────────────────────────────────────┐
│ Using the velocity measurements to acquire a velocity waveform. │
└─────────────────────────────────────────────────────────────────┘
                                ↓
┌─────────────────────────────────────────────────────────────────┐
│ Using the velocity waveform and processing the velocity         │
│ waveform to extract the loss angle and the magnitude of the     │
│ dynamic modulus of the sample.                                  │
└─────────────────────────────────────────────────────────────────┘
```

FIG. 10

METHODS OF DYNAMIC MECHANICAL ANALYSIS USING NUCLEAR MAGNETIC RESONANCE

FIELD

The present invention relates to dynamic mechanical analysis and nuclear magnetic resonance in general.

BACKGROUND

Dynamic mechanical analysis (DMA) is an umbrella term for a variety of rheological experiments in which the response of a sample subjected to an oscillatory force is measured to characterize its dynamic properties. Dynamic mechanical analysis (DMA) refers to the measurement of a material's response to an oscillating force [1]. This classification applies to a large assortment of rheological measurements that characterize the dynamic properties of materials. DMA measurements can differ in several ways, including the method of excitation, the equipment used to measure the response, the information the response provides, and the materials that can be analyzed.

Certain imaging modalities, including magnetic resonance, provide a key advantage in DMA measurements due to their ability to observe the response of samples located beyond barriers, such as imaging the elastic response of the liver [2]. This technique, known as elastography, was first introduced for ultrasound in 1991 [3]. Prior to elastography, only qualitative measurements of tissue elasticity, such as the palpation technique, were possible in medicine. In the following decades, elastography rapidly expanded into other imaging techniques including Magnetic Resonance Imaging (MRI) [4], with more recent advancements exploring the measurement of tissue viscoelasticity [5].

Despite the advantages of MRI elastography (MRE), some challenges exist that limit its practicality. Scanners are large, expensive, and in high demand. Therefore, it is often more sensible to image conventionally without the added sophistication required for MRE or to employ more portable and cost-effective ultrasound (US) elastography methods.

Since the advent of the NMR-mouse [6], compact magnets have seen applications in many facets of NMR [7]. The low cost and portability of these magnets allow NMR to be applied in measurements that would otherwise be impractical with conventional systems. Therefore, merit exists in investigating DMA measurements using portable NMR with the long-term objective of developing a more portable, cost-effective MRE technique. Previous work in the detection of vibrations using portable NMR has shown a decrease in signal intensity when synchronizing the CPMG sequence with vibrations [8] and the ability to measure the elastic modulus using velocity propagators [9].

SUMMARY

The present disclosure in one aspect relates to a method for the characterization of the viscoelasticity of a sample through the acquisition of complete velocity waveforms.

The present disclosure in another aspect relates to a method for DMA that employs a small unilateral three magnet array with an extended constant gradient to measure the velocity of a vibrating sample. By orienting the vibrations in the direction of the gradient, the motion-sensitized phase accumulation is used to determine the velocity. By implementing delays into the pulse sequence, the phase is measured at spaced points in the vibration cycle, allowing for the acquisition of a complete velocity waveform. Using velocity waveforms, samples are characterized through differences in amplitude and phase, providing information on the magnitude of the dynamic modulus and loss-angle, respectively.

The present disclosure in one aspect relates to a method of dynamic mechanical analysis of a sample including providing a magnet with a constant gradient where at least a portion of the sample is in the constant gradient, inducing a vibration in the sample in the direction of the constant gradient, the vibration comprising a vibration waveform and a vibration period, generating an NMR pulse sequence comprising at least two pulses with a delay between the pulses, acquiring echos from the pulse sequence at multiple points along the vibration period, measuring the phase of the NMR signal at each of the acquired echos, using the phase of the NMR signal to measure the velocity of the vibration at the multiple points where the echos are acquired, using the velocity measurements to acquire a velocity waveform, and using the velocity waveform and processing the velocity waveform to extract the loss angle and the magnitude of the dynamic modulus of the sample.

BRIEF DESCRIPTION OF THE DRAWINGS

Embodiments of the present invention will be described with reference to the accompanying drawings, wherein like reference numerals denote like parts, and in which.

Figure 9:
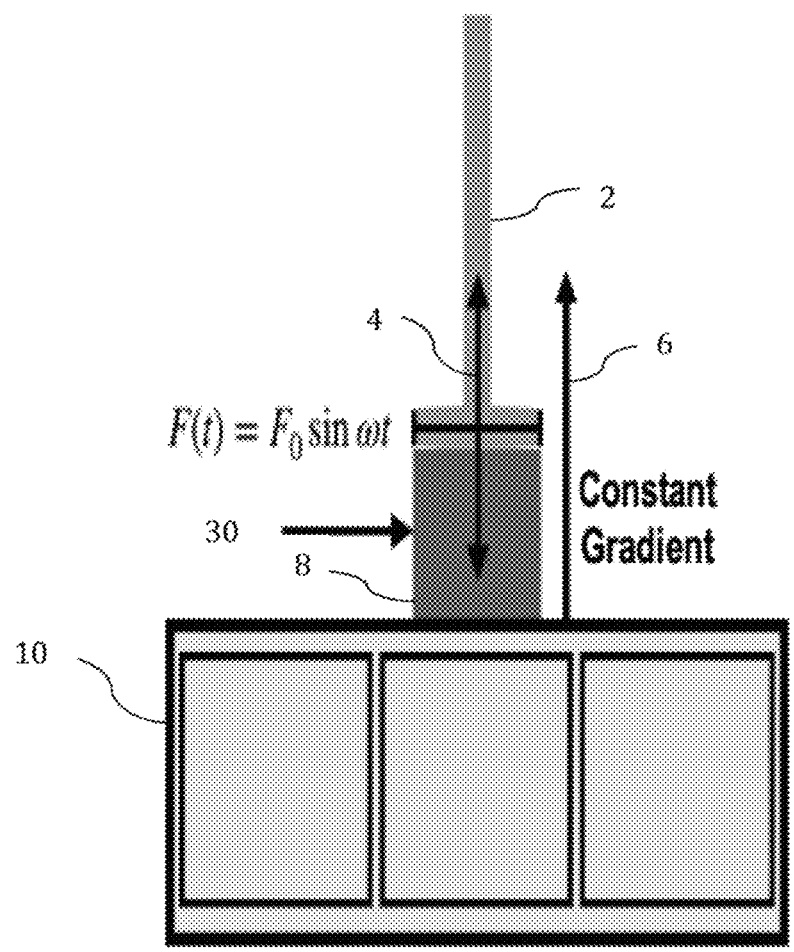

FIG. 9 is a diagram of a set-up with a magnet, sample and vibration-inducing device according to an embodiment of the present invention; and FIG. 10 is a flow diagram illustrating one example of a method according to an embodiment of the present invention.

DETAILED DESCRIPTION

The present invention in one embodiment uses a unilateral three-magnet array with an extended constant gradient of 254 G/cm perpendicular to its surface. With a sample vibrating in the direction of the gradient, the motion-sensitized phase is measured at the peak of the first echo. With a short echo time relative to the vibration period, the phase can be used to measure velocity. By synchronizing the NMR acquisition with the vibrations and inserting delays into the pulse sequence, velocity can be measured at various points along the vibration period. With a sufficient number of velocity measurements along the vibration period, the velocity waveform of the vibrating sample can be acquired. Processing the velocity waveform yields information on the sample's loss angle and the magnitude of the dynamic modulus. The present invention in a further embodiment relates to the use of the second echo, and the use of complex waveforms to excite multiple frequencies in a single measurement.

EXPERIMENTAL

Vibration Apparatus

Synthetic viscoelastic urethane polymer samples (Sorbothane™, Ohio, U.S.A.) of varied hardness were analyzed to provide proof of concept for the measurement. Sorbothane samples were selected because they have been characterized by the manufacturer with conventional DMA techniques and have tabulated dynamic properties. Although reduced hydrogen content results in decreased signal compared to water-based samples, there are no concerns over sample drying or diffusion, making the samples relatively easy to work with over long periods of time. Additionally, a short $T_1$ relaxation time of approx. 17 ms (OO70) allows for measurements to be made relatively quickly with a short repetition time. The hardness of the samples as specified by the manufacturer was measured on the Shore "OO" scale. Samples used in order of increasing hardness were OO40, OO50, OO60, and OO70. Cylindrical samples with diameters of 1.65 cm were cut from rectangular sheets 1.27 cm in thickness.

A Mini-Shaker Type-4810 (Brüel & Kjær, Denmark) was used to vibrate the samples against the surface of the magnet. The Type-4810 requires a limitation of currents to under 1.8 A to prevent over-driving, thus the present inventors employed a current limiting $3B^3$ power amplifier (Bryston™, Ontario, Canada) with the output connected to the shaker. The SDG1025 Arbitrary Waveform-Function Generator (Siglent™, China) was connected to the input of the power amplifier and generated sinusoidal waveforms at 100 Hz. A 9712A50 piezoelectric force sensor (Kistler™, Switzerland) was connected to the shaker and measured its force output. The shaker was affixed to a 3D-printed assembly using a threaded rod and wing nuts for adjustment of its position. The opposite side of the force sensor was connected to a nylon excitation stinger (TMS™, Ohio). The stinger is a thin, flexible rod that is stiff in the axial direction, and flexes in the lateral direction, reducing side loads exerted on the test structure. Additionally, the stinger provides distance between the magnet and shaker, preventing a possible missile effect between them when moving the magnet into position. The free end of the stinger was connected to a plastic disc to ensure that forces were applied over the entire cross-section of the sample. Samples were compressed initially against the surface of the magnet to prevent shifting due to gravity. To maintain a constant initial compression between samples, the present inventors employed a KD-300 fotonic gap sensor (MTI Instruments, New York) directed at a metal plate positioned adjacent to the shaker. After bringing the plastic disc in contact with the sample without compression, the shaker was shifted towards the magnet until the voltage output by the sensor increased by 200 mV, corresponding to approx. 0.15 mm of compression according to the sensor's calibration curve. This compression was small enough to neglect changes in sample geometry. With the sample in place, a stationary measurement was acquired before driving the sample with oscillating forces ranging from 0.7 N to 2.1 N peak-to-peak. The vibration apparatus set-up is depicted in FIG. 1.

NMR Measurements

Figure 1:
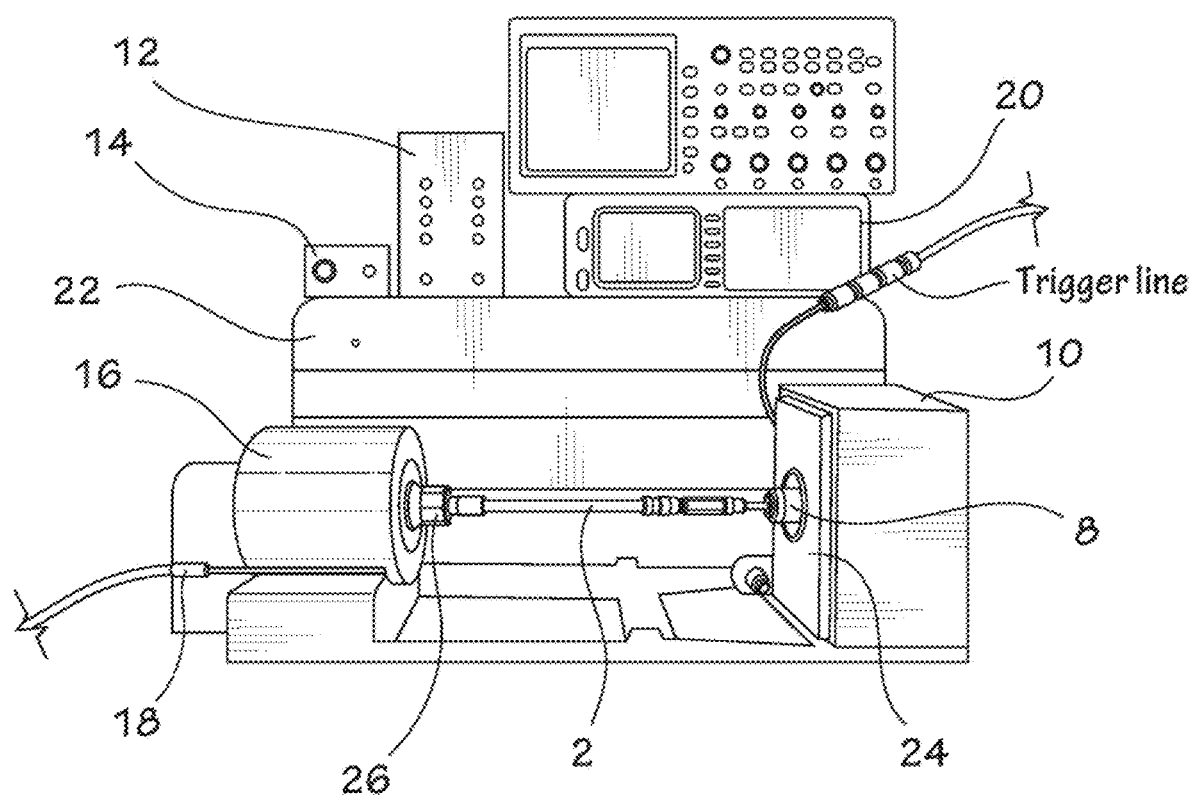
FIG. 1 is a photograph of an experimental apparatus set-up which can be used to induce axial vibrations in samples compressed against the surface of the magnet.

Referring to FIG. 1 and FIG. 9, for the NMR measurements, a unilateral three-magnet array 10 was employed with a constant gradient of 254 G/cm in a sensitive spot perpendicular to its surface (approx. 2 cm above its surface indicated generally at 30) [10]. A radio frequency (RF) probe 24, which is a surface coil tuned to a frequency of 5.43 MHz, was positioned inside the sensitive spot 30. Using the reflection mode method [11], the quality factor of the coil 24 was measured to be 40. Coil 24 was held in place by a circuit board with a hole through its center, allowing for compression of sample 8 against the surface of the magnet 10 without making contact with the coil 24. Rubber spacers were placed between the circuit board and magnet 10 to dampen the transfer of vibrations to the coil 24, which became prominent at higher amplitudes. To avoid potential effects of vibrations on the circuitry, a separate box held the tuning and matching network and was connected to the coil 24 via a BNC connector. The RF probe 24 was connected to a duplexer with the transmit end connected to an RF pulse amplifier (Tomco™, AU) and the receiving end connected to the input of a pre-amplifier (Miteq™, N.Y). The output of the pre-amplifier was connected to the LapNMR console (Tecmag™, TX), with a 10.7 MHz low-pass filter in-line to reduce noise.

Pulse sequences were configured in NTNMR (Tecmag, TX) and synchronized with the vibrations by an external trigger pulse generated on the second channel signal generator. A two-dimensional (2D) table of delays followed the trigger pulse, allowing for the acquisition of echoes at multiple points along the vibration period. With 2048 scans for each delay, a complete 100 Hz vibration cycle with 10 evenly spaced velocity points can be captured in about 6 minutes.

Attenuation of 4.2 us pulses by 17 and 11 dB generated 90° and 180° pulses, respectively. The 4.2 us pulse-width corresponds to a 0.19 cm slice of the sample, located approx. 0.2 mm from the edge where the force is applied. Two echoes were acquired by applying a 90° pulse followed by two 180° pulses with an echo time of 0.5 ms. The phase in the NMR signal at the peak of each echo was used to determine the velocity, allowing for the reconstruction of the velocity waveform. Velocity waveforms were then processed to calculate the loss-angle and magnitude of the dynamic modulus for each sample.

THEORY

NMR Phase Accumulation

In the presence of a gradient, the NMR signal phase becomes sensitive to motion. The phase accumulates according to the following [12], $$\phi = \int \gamma \vec{G}(t) \cdot \vec{r}(t) dt \quad (1)$$

If the present inventors consider motion only in the x-direction, and a constant gradient in the x-direction, equation 1 becomes, $$\phi = \gamma G \int x(t) dt \quad (2)$$

where γ is the gyromagnetic ratio, G is the magnetic field gradient, and x(t) is the position function.

The phase expressions for the vibrating sample were developed in two ways: using the Taylor expansion to approximate the position function to first-order, and without approximation assuming a sinusoidal function for the position.

With Approximation

Using the Taylor expansion for the position to first-order, the present inventors obtain, $$x(t) = x_0 + v(t)t \quad (3)$$

Thus, determining the motion-induced phase necessitates the subtraction of a non-zero phase for a stationary sample from the measured phase. To determine an expression for the motion-induced phase, the present inventors assume the velocity is constant over the echo time, requiring the echo time to be much shorter than the vibration period. The present inventors begin with the phase accumulation directly after the 90° pulse and integrate to find the motion-induced phase at the first echo given by, $$\phi(2\tau) = -\phi(\tau) + \gamma G v \int_\tau^{2\tau} t\, dt = \gamma G v \tau^2 \quad (4)$$

where v is the average velocity in the slice over the echo time.

Without Approximation

Considering the position function without approximation, the vibration is a sinusoidal function of the form, $$x(t) = x_0 \sin(\omega t + \delta) \quad (5)$$

Following a similar analysis, the present inventors can obtain expressions for the phase at the first and second echoes, $$\phi(2\tau) = \frac{\gamma G x_0}{\omega}[2\cos(\omega\tau + \delta) - \cos\delta - \cos(2\omega\tau + \delta)] \quad (6)$$

$$\phi(4\tau) = \frac{\gamma G x_0}{\omega}[2\cos(3\omega\tau + \delta) + \cos\delta - 2\cos(\omega\tau + \delta) - \cos(4\omega\tau + \delta)] \quad (7)$$

Subtracting the second echo from the first and simplifying, the present inventors obtain, $$\phi(2\tau) - \phi(4\tau) = \frac{4\gamma G x_0 \sin^2\frac{\omega\tau}{2}}{\omega}[2\cos(\omega\tau - \delta) - \cos(3\omega\tau + \delta)] \quad (8)$$

This approach can be used to find a general expression for the phase at the Nth echo as follows, $$\phi(2N\tau) = \frac{\gamma G x_0}{\omega} \left[\sin(2N\omega\tau + \delta) + (-1)^{N+1}\left[2\sum_{k=0}^{N-1}\sin((2k+1)\omega\tau + \delta)(-1)^{k+1} + \sin\delta\right]\right] \quad (9)$$

However, the above expression does not account for stimulated echoes occurring further down the echo train, reducing the utility of subsequent echoes for the time being. The stimulated echo superimposed onto the second echo can be removed with the application of a variation of the phase cycle described by Fabich et al. [13]. Cycling the 90° pulse and receiver between + and −x, and the first 180° pulse between + and −y results in an inversion of the sign of the stimulated echo and cancellation upon even numbers of acquisitions.

Dynamic Properties

A sample subjected to a sinusoidal stress will respond with sinusoidal deformation. In the Hookean limit (perfectly elastic), the resultant strain is in phase with the stress, while in the viscous limit the strain is 90° out of phase. Viscoelastic materials fall in between these limits. Assuming the viscoelastic behavior is linear, the resultant strain shifts from the applied stress by an angle, δ, termed the loss angle. Therefore, the strain in the sample can be broken into in-phase and out-of-phase components, the vector sum of which provides the complex strain. As a result, the modulus of the material is split into a storage component, E', and a loss component, E". These components are calculated as follows [1], $$E' = \frac{F}{bk}\cos\delta \quad (10)$$

$$E'' = \frac{F}{bk}\sin\delta \quad (11)$$

where F is the force applied on the sample, k is the displacement within the sample, and b is the geometric factor of the sample. The geometric factor depends on both the shape of the sample and the method of excitation. The magnitude of the complex modulus can be determined without knowledge of the loss-angle as follows, $$|E^*| = \sqrt{E'^2 + E''^2} = \frac{F}{bk} \quad (12)$$

DMA measurements are commonly conducted using shear stresses. However, in more limited cases, bulk longitudinal excitation can be applied. For soft solids, assuming that longitudinal waves propagate along thin strips with lateral dimensions small compared to a wavelength and that deformations are small, the geometric factor is that of simple extension [14], $$b = \frac{A}{l} \tag{13}$$

where A is the cross-sectional area over which the force is applied, and l is the thickness of the sample. Thus, measurement of the displacement (or velocity) at various forces can be used to determine the magnitude of the complex modulus by taking the slope of the velocity plotted against force. In addition, the loss-angle can be measured through the phase offset between the applied force and sample response waveforms. If the Poisson ratio of the material is known, other dynamic properties such as the complex shear modulus, complex viscosity, and complex compliance can also be determined.

Diffusive Attenuation

Although diffusive effects were negligible for Sorbothane samples, they will have an impact in attenuating the signal when attempting to characterize water-based samples that resemble biological tissues. Accounting for diffusion, the first echo signal will be attenuated according to, $$S = S_0 \exp\left[-\frac{2}{3}\gamma^2 G^2 D\tau^3\right] \tag{14}$$

where D is the diffusion constant of the sample. The present inventors can determine the maximum velocity that can be measured for a given echo time at various diffusion coefficients by solving equations 4 and 14 for G and equating. Imposing the conditions that the signal is attenuated by less than a factor of 10 and that phase accumulation be limited to a maximum of $2\pi$ to prevent phase-wrapping, the maximum measurable velocity is given by, $$v = \sqrt{\frac{8\pi^2 D}{3\pi \ln 10}} \tag{15}$$

Figure 2:
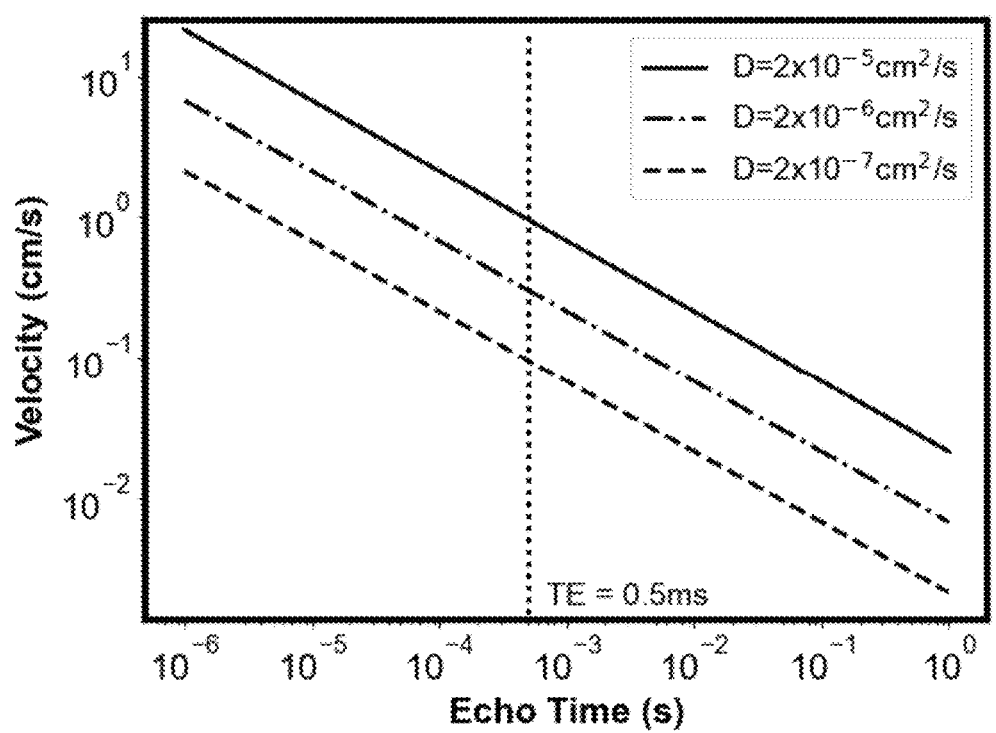
FIG. 2 is a graph displaying analysis of velocities against echo time that can be measured without phase wrapping and attenuation of less than a factor of 10. Samples with diffusion coefficients of water (solid line), 10% of water (dash-dot line), and 1% of water (dashed line) are shown. The echo time of 0.5 ms used in the current measurements is shown by the vertical dotted line.

Velocities are plotted against echo times for various diffusion coefficients of a sample in FIG. 2. The solid line corresponds to the diffusion coefficient of water ($2\times10^{-5}$ cm$^2$ s), and the dash-dot and dashed lines correspond to 10% ($2\times10^{-6}$ cm$^2$ s) and 1% ($2\times10^{-7}$ cm$^2$ s) of the diffusion coefficient of water, respectively. The echo time of 0.5 ms used in the current work is shown by the vertical dotted line.

With this analysis, experiments can be designed around water-based samples, such as biological tissues and agar gels, a commonly used phantom in elastography [15]. This analysis is independent of the gradient strength and applies to any magnet providing it has a constant gradient along which vibrations are applied, allowing for flexibility in the method of excitation. With a simple measurement of the sample's diffusion coefficient, the above analysis can be used to select amplitudes and echo times that limit the effects of diffusive attenuation and phase-wrapping.

Methods of the present invention, in certain embodiments, can be used to analyse samples in the plastics and polymer industry, such as for quality assessment and product development; in the rubber industry (tire and non-tire), such as to study the performance of rubber materials; in health care, such as to characterize components made of polymers in medical devices, tissue engineering scaffolds, fixation, and regeneration of tissues, which undergo stress and varied environments (for example temperature and strain); in industrial automation, such as to characterize surfaces and materials to, for example, predict or prevent machine failures; and in the food industry, for example for food rheology, that is, to evaluate the mechanical properties of food and how they are affected by processing and storage.

RESULTS AND DISCUSSION

Single Echo

Figure 3:
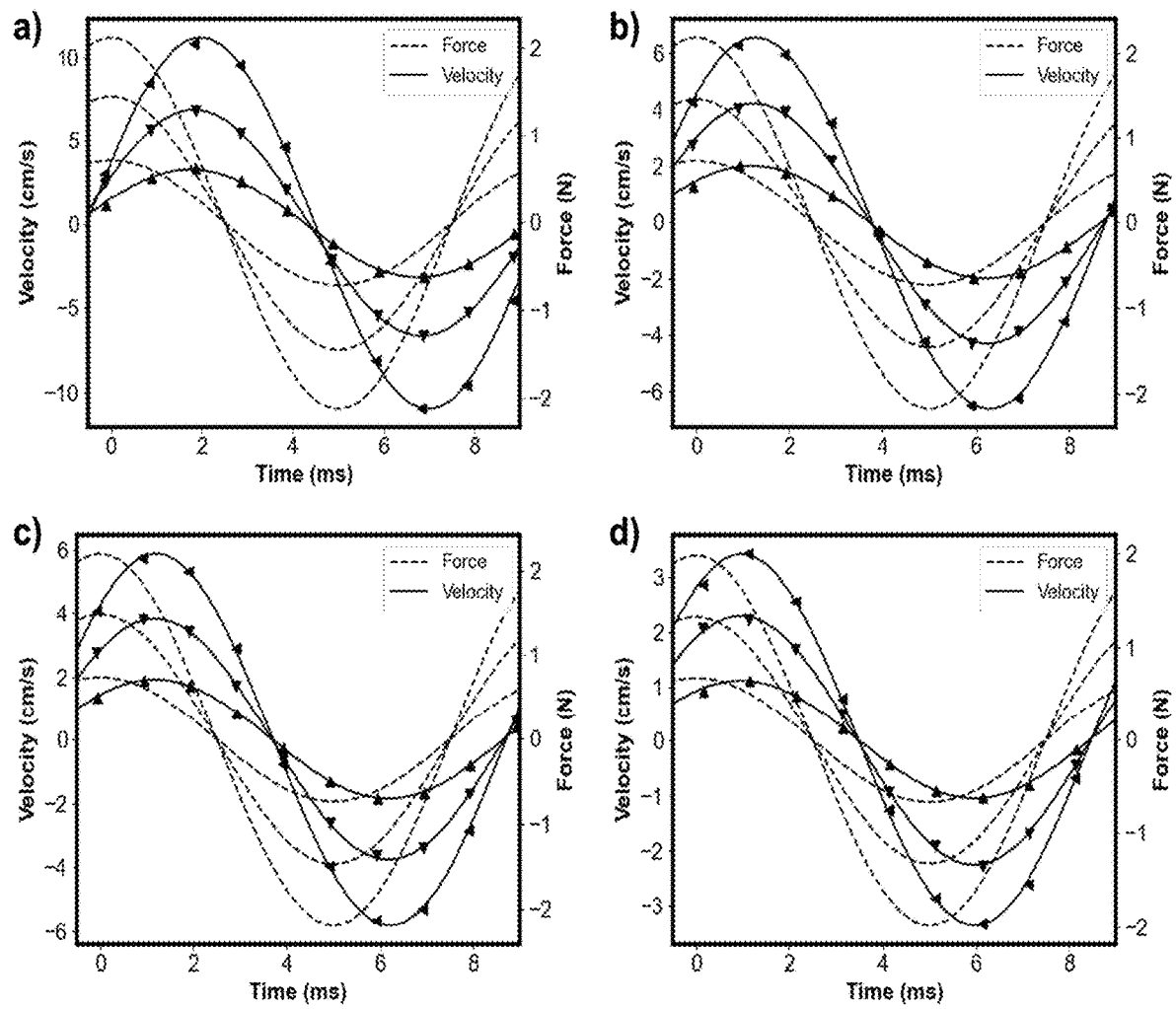
FIG. 3 consists of four graphs a), b), c) and d) of measured velocity waveforms plotted for a) OO40, b) OO50, c) OO60, and d) OO70 Sorbothane samples vibrating at 100 Hz. Superimposed using dashed lines are force waveforms measured with the force sensor, shifted in phase by 90°.

Measurements of velocity at intervals of 1 ms throughout the 10 ms vibration period are shown in FIG. 3. Forces ranging from 0.7 N to 2.1 N peak-to-peak measured with the piezoelectric force sensor are plotted using dashed lines. Velocities are fitted to a sinusoidal function and plotted with the force waveforms for a) OO40, b) OO50, c) OO60, and d) OO70 Sorbothane samples. Given that velocity is measured and not displacement, the expected behavior of strain lagging stress can be observed by shifting the phase of the force waveforms by 90°.

Velocity waveforms exhibit clear differences in both amplitude and phase between samples and yield information pertaining to the magnitude of the dynamic modulus and loss angle through further analysis.

Measurement of the Loss-Angle

The loss-angle is measured using the fitted value of the phase offset for each amplitude. Measurements of the loss-angle along with the expected values are shown in Table 1. To further aid with comparison, the difference between the measurements for OO70 and the expected value ($\Delta_{OO70}$) is subtracted from all measurements. Uncertainties are quantified through the uncertainties in the fitted values of the phase offsets.

The measurements show that the dependence of the loss angle on the sample's hardness agrees with expectations, with a larger loss for softer samples. However, there is some discrepancy when comparing the measurements to the expected values, with the deviation increasing for softer samples and higher amplitudes. This is explained by the presence of shear waves that propagate in the direction perpendicular to the gradient in which the phase is insensitive. This is explained by the presence of shear waves that propagate in the direction perpendicular to the gradient in which the phase is insensitive to motion, resulting in a larger apparent loss, and hence a larger measured loss-angle. When cutting cylindrical samples from rectangular sheets, it was difficult to achieve an ideal shape for softer samples. These samples became skewed, resulting in more prominent shear components.

TABLE 1

Measured and expected loss-angles for OO40, OO50, OO60, and OO70 Sorbothane samples.

| | Amplitude (N) | OO40 | OO50 | OO60 | OO70 |
|---|---|---|---|---|---|
| Measured δ (rad) | 0.7 | 1.101 ± 0.013 | 0.751 ± 0.017 | 0.734 ± 0.006 | 0.604 ± 0.014 |
| | 1.4 | 1.150 ± 0.005 | 0.779 ± 0.008 | 0.738 ± 0.005 | 0.602 ± 0.008 |
| | 2.1 | 1.239 ± 0.009 | 0.804 ± 0.005 | 0.759 ± 0.003 | 0.613 ± 0.009 |

TABLE 1-continued

Measured and expected loss-angles for OO40, OO50, OO60, and OO70 Sorbothane samples.

|  | Amplitude (N) | OO40 | OO50 | OO60 | OO70 |
|---|---|---|---|---|---|
| $\delta - \Delta_{OO70}$(rad) | 0.7 | 0.871 ± 0.013 | 0.521 ± 0.017 | 0.504 ± 0.006 | 0.374 ± 0.014 |
|  | 1.4 | 0.920 ± 0.005 | 0.549 ± 0.008 | 0.508 ± 0.005 | 0.372 ± 0.008 |
|  | 2.1 | 1.009 ± 0.009 | 0.574 ± 0.005 | 0.529 ± 0.003 | 0.383 ± 0.009 |
| Expected $\delta$ (rad) | Independent | 0.5722 | 0.5760 | 0.4297 | 0.3736 |

Figure 4:
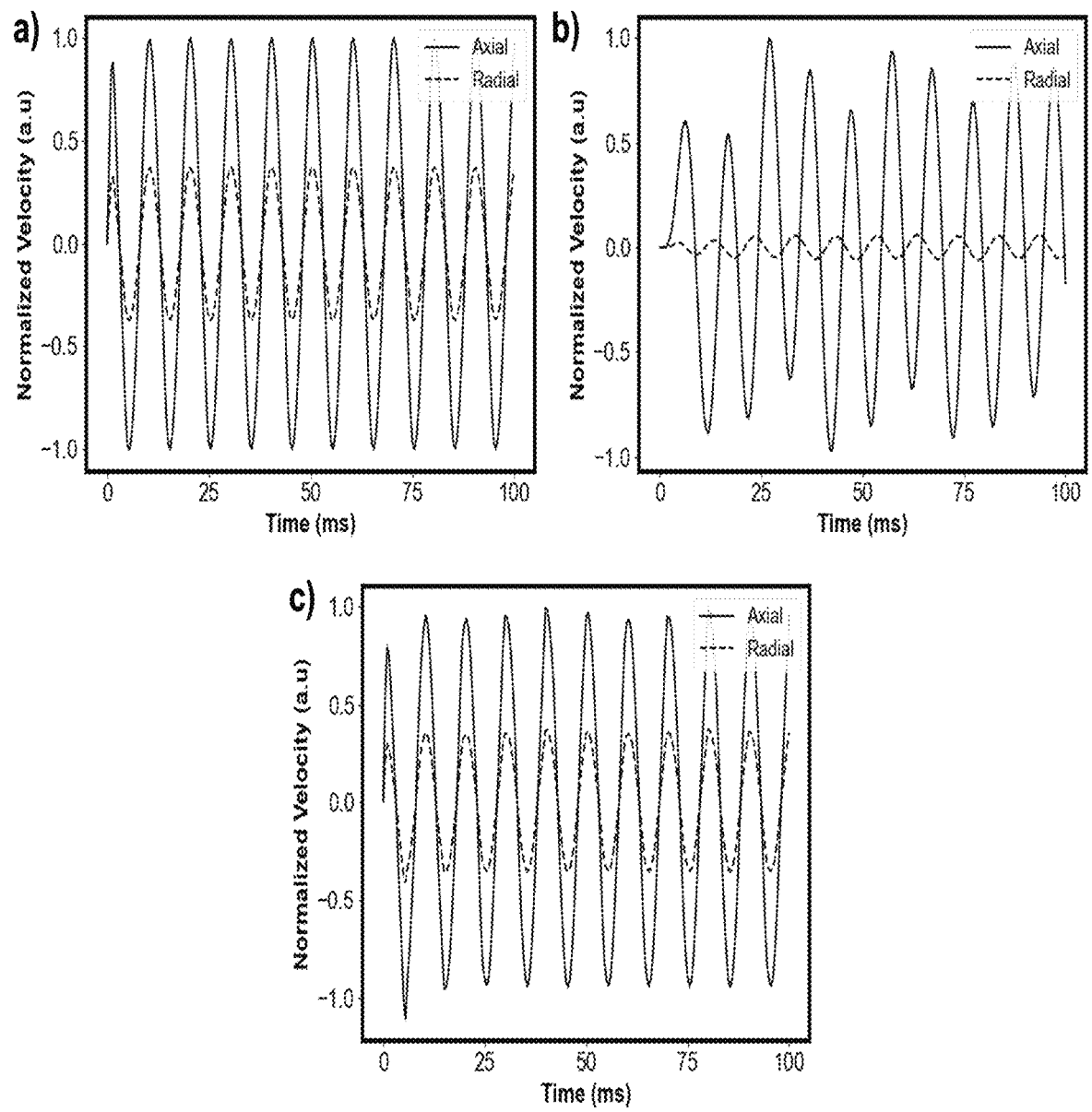
FIG. 4 consists of three graphs a), b) and c) of finite element analysis showing radial and axial velocity components of Sorbothane samples under an axial load of 1N oscillating at 100 Hz, normalized to the peak axial velocity for a) OO30 with actual geometry, b) OO30 with extended geometry (length of 12.7 cm), and c) OO70 with actual geometry. Simulations are for a point ¾ of the way along the radius at the axial midpoint.

Finite element analysis of the samples performed using Comsol Multiphysics 4.5 (Comsol, SE) supports these findings, shown in FIG. 4. The radial (shear) component, normalized to the peak of the axial (compressive) component is shown by the dotted line, and the axial component is shown by the solid line. 1D simulations show a point ¾ of the way along the radius at the axial midpoint, results in 2D are shown in the supplementary material. a) and c) show simulations using actual geometry for OO30 and OO70 samples, respectively. b) shows a simulation for a OO30 sample extended in length by a factor of 10, giving a length of 12.7 cm.

Radial velocity components make up a significant fraction of the axial components, especially for thin samples. The present inventors further observe that as the sample becomes longer, the impact of radial components lessens. Thus, working with samples where the diameter is small compared to the thickness is one possible way to reduce the impact of shear components.

Measurement of the Dynamic Modulus

Figure 5:
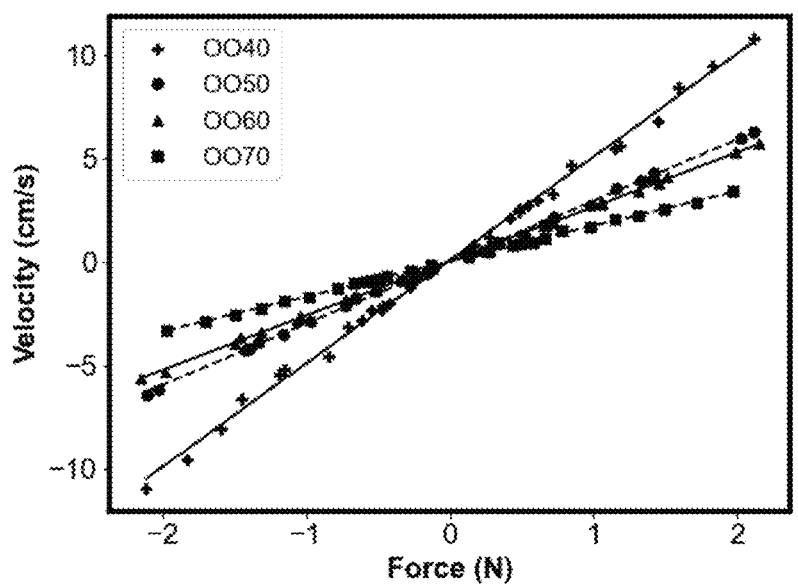
FIG. 5 is a graph of velocity plotted against force fitted linearly for OO40, OO50, OO60, and OO70 Sorbothane samples.

By shifting the velocity waveforms in phase with the force waveforms, the present inventors can plot the measured velocity against the force for each sample, shown in FIG. 5. Results are shown for OO40, OO50, OO60, and OO70 Sorbothane samples with larger slopes corresponding to softer samples.

Using least-squares fitting to determine the slope, the magnitude of the dynamic modulus can be found from Equation 12. Table 2 shows the measured slopes and corresponding magnitudes of dynamic moduli, along with the expected values obtained from Sorbothane for OO40, OO50, OO60, and OO70 samples.

The present inventors clearly observe the expected dependence of the dynamic modulus on the hardness of the sample. Our measurements are in close agreement with expected values for stiffer samples, but fall short for softer samples, similarly to the measurements of the loss angle. The explanation follows the same reasoning, the presence of shear components that become more prominent for softer, skewed samples.

Another likely cause for the deviation from expected values is explained by Saint Venant's principle. The principle asserts that if self-equilibrated loads are applied on one end only of a long cylinder, then the strain produced in the body by such forces is much larger near the loaded end than at points far from the loaded end [16]. Therefore, larger strains near the edges of the sample where the velocity is measured result in a reduction of the measured dynamic modulus. The finite element analysis in 2-dimensions demonstrates this effect. When using longer samples to limit the impact of shear components, one should ensure that measurements are taken far from the edges of the sample to limit the effects of St Venant's principle.

Measurements of Multiple Echoes

Figure 6:
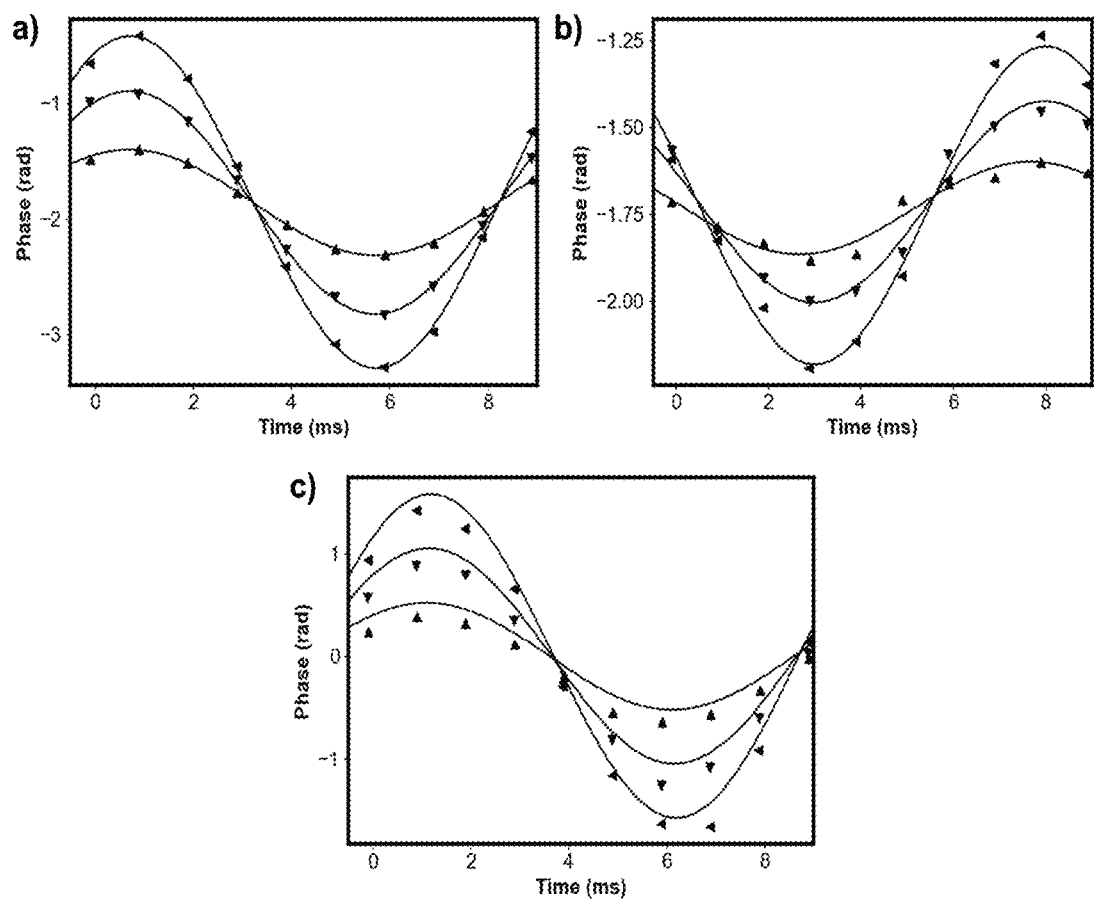
FIG. 6 consists of three graphs a), b) and c) of measurements of Nuclear Magnetic Resonance (NMR) signal phase fitted to the unapproximated equations for a OO70 Sorbothane sample vibrating at 100 Hz for a) the first echo, b) the second echo, and c) the difference between the first and second echoes.

Measurements of the NMR signal phase at the first two echoes, along with the difference between the echoes are fitted to Equations 6-8. Note that a constant offset term was added to the expressions for the first and second echoes. Slight differences in these offsets result in a moderate shift when plotting the difference in phase between echoes. The present inventors observe that the fitting deteriorates for the second echo, likely an effect of decreased sensitivity to phase caused by the lower intensity of the second echo due to the short $T_2$ relaxation times of Sorbothane samples (approx. 5 ms for OO70). FIG. 6 shows the NMR signal phase at intervals of 1 ms along the 10 ms vibration period for a OO70 Sorbothane sample at a) the first echo, b) the second echo, and c) the difference between the first and second echoes.

It is possible that reducing the echo time would improve these results; however, doing so would cause a significant reduction of the field of velocities that could be measured without the occurrence of phase-wrapping. These results suggest, however, that the utility of the second echo and subsequent echoes would improve for samples with longer $T_2$ relaxation times. Therefore, the increase in acquisition time that would be encountered for samples with longer $T_1$ relaxation times could be offset by the acquisition of multiple echoes. Furthermore, if stimulated echoes can be eliminated, it may be possible to cover a complete period of vibration, negating the need for delays in the pulse sequence with a single CPMG sequence, or at least reducing the amount of delays required.

TABLE 2

Measured slopes and corresponding magnitudes of dynamic moduli along with expected values for OO40, OO50, OO60, and OO70 Sorbothane samples vibrating at 100 Hz.

| Sample | OO40 | OO50 | OO60 | OO70 |
|---|---|---|---|---|
| Slope (Ncm$^{-2}$) | 5.006 ± 0.053 | 2.922 ± 0.018 | 2.636 ± 0.011 | 1.704 ± 0.009 |
| Measured |E*| (MPa) | 0.793 ± 0.014 | 1.333 ± 0.008 | 1.4159 ± 0.006 | 2.1906 ± 0.012 |
| Expected |E*| (MPa) | 1.3607 | 1.7035 | 1.7226 | 2.24293 |

Complex Waveform Analysis

In DMA measurements, it is common practice to sweep the excitation frequency to extract the frequency dependant behavior of dynamic properties [1]. In conventional DMA measurements, it is feasible to sweep the frequency of sinusoidal waveforms. This approach is impractical with portable NMR due to the long acquisition time associated with acquiring a complete waveform, especially at lower frequencies. However, complex waveforms containing multiple frequency components, such as square waves, could allow for an expedited measurement. This extension of DMA, known as Fourier Transform Mechanical Spectroscopy (FTMS), although not widely adopted, has been shown to be an effective way of measuring dynamic properties with conventional detectors [17, 18]. In this section, the present inventors demonstrate how the same principle can be adapted to measure a sample's response with portable NMR as a detector.

Figure 7:
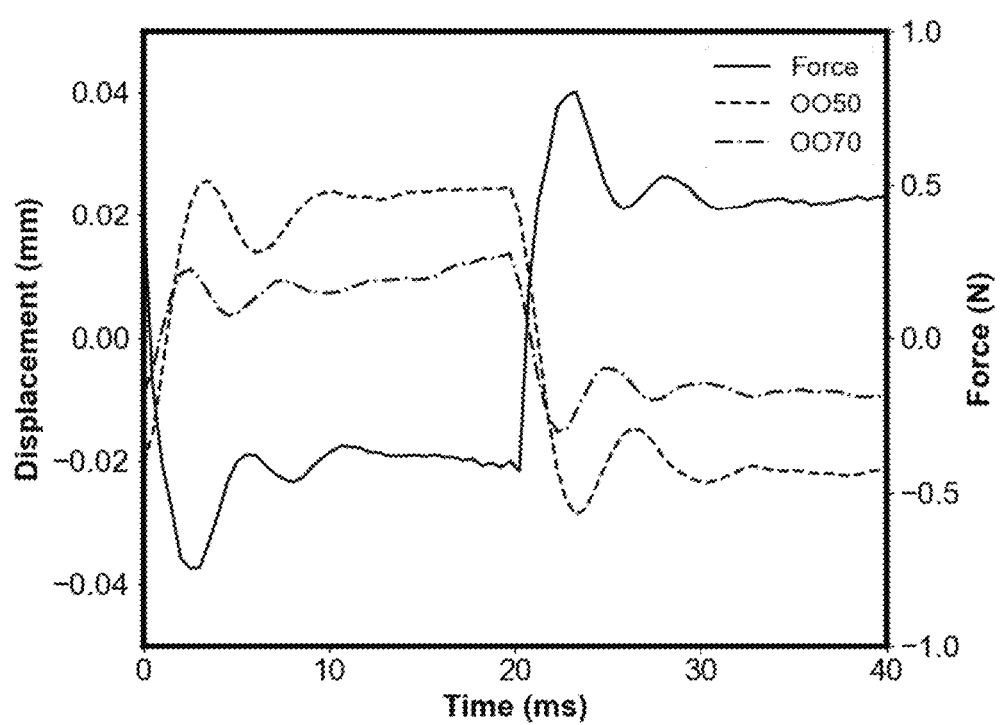
FIG. 7 is a graph of complex waveforms generated by driving the shaker with a 25 Hz square waveform measured using the force sensor (solid line) and NMR for OO50 (dashed line) and OO70 (dash-dot line) Sorbothane samples.

It was found that due to operating limitations, the Type-4810 MiniShaker could only begin to reproduce square waveforms at lower frequencies. Thus, to test this measurement, a square waveform drove the shaker at 25 Hz and was measured with the force sensor. Velocities were measured at evenly spaced points in the vibration cycle in the same fashion as sinusoidal excitation. Instead of 1 ms delays, 0.5 ms delays were used to achieve better resolution, with 80 points measured to acquire a complete period of vibration. Numerical methods such as standard trapezoidal integration [19] and fourth-order Runge-Kutta [20] tend to be inaccurate when integrating timeseries data. Therefore, the measured velocity waveform was integrated in the frequency domain by a long DFT to find the displacement waveform [21]. This method was tested for OO50 and OO70 Sorbothane samples. Measured waveforms obtained using the force sensor (solid line) and NMR (integrating to find the displacement) for OO50 (dashed line) and OO70 (dash-dot line) samples are shown in FIG. 7.

Figure 8:
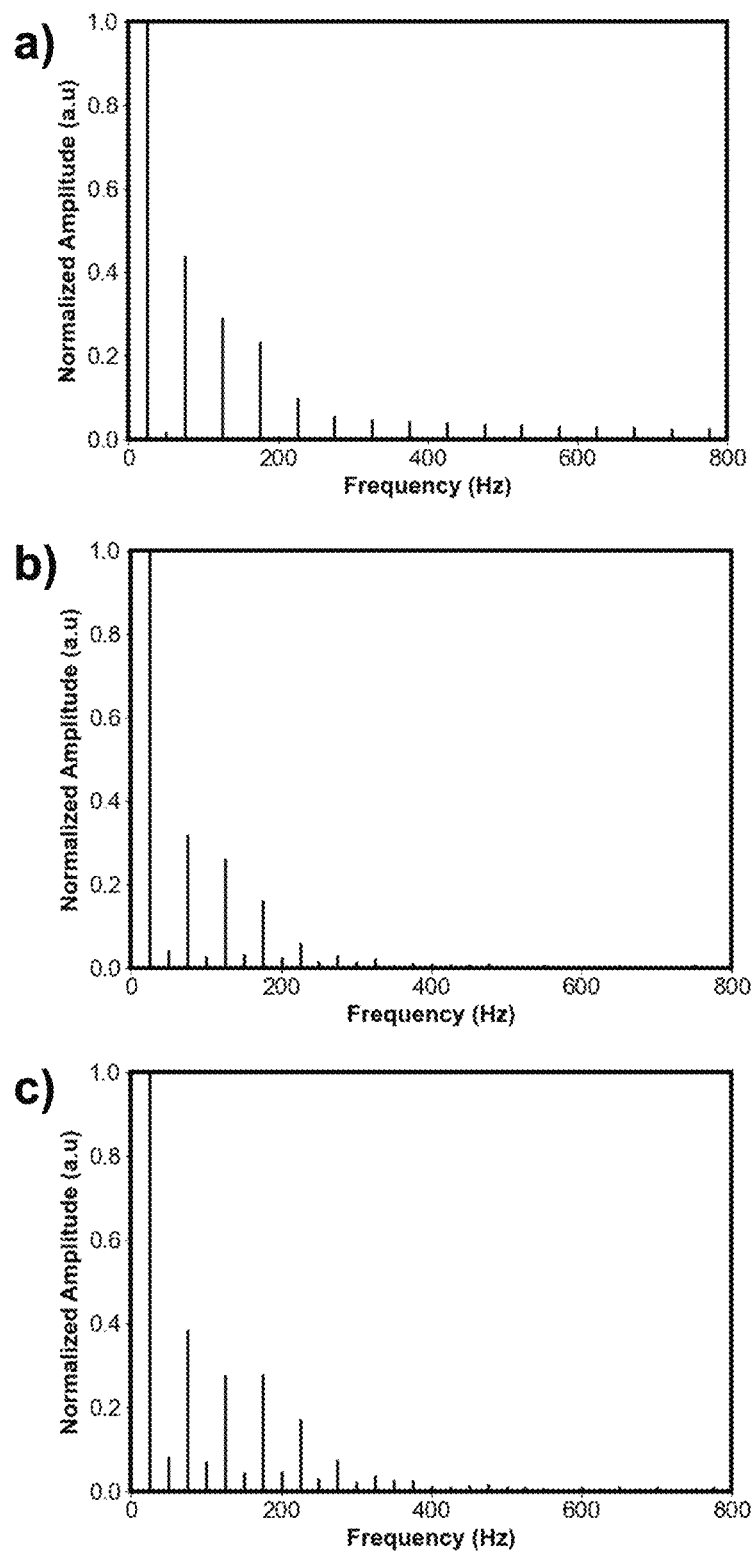
FIG. 8 consists of three graphs a), b) and c) of frequency spectra for a) the force sensor waveform, b) the OO50 displacement waveform measured with NMR, and c) the OO70 displacement waveform measured with NMR.

Frequency spectra were found by taking the Fourier transform of the waveforms and normalizing to the amplitude of the peak at the fundamental frequency of 25 Hz. FIG. 8 shows the frequency spectra of the waveforms measured with a) the force sensor, b) NMR for the OO50 sample, and c) NMR for the OO70 sample.

These results show that the methods used for the measurement of sinusoidal waveforms can be applied when samples are excited with complex waveforms. Furthermore, the present inventors observe a clear difference in the spectra between the applied and measured waveforms. Moderate differences exist when comparing the spectra of the two samples, and the method according a further embodiment of the present invention can be used for extracting frequency dependant behavior of dynamic properties.

The use of square waves provides important information on the feasibility of the technique; however, it is more practical to employ simpler waveforms with fewer frequency components due to mechanical limitations. Malkin suggests that the optimal input waveform is a sinc function, also known as an equistrain waveform. An equistrain waveform would provide uniform strain across the entire band of frequencies, resulting equal amplitudes for all harmonics. This makes the equistrain waveform ideal for the measurement of dynamic properties.

FIG. 9 is a schematic diagram of part of the set-up of FIG. 1 with a unilateral three-magnet array 10, sample 8, and excitation (shaker) stinger 2. Unilateral three-magnet array 10 generates a constant gradient in direction 6 which is in a direction perpendicular to the surface of magnet array 10. Sample 8 is vibrated along axis 4 which is parallel to the axis of direction 6 of the constant gradiant by electrodynamic shaker 16 connected to excitation stinger 2. In another embodiment, magnet array 10 can be vibrated together with sample 8.

While a unilateral three-magnet array is used in certain embodiments of the present invention, in other embodiments, any magnet or array of magnets that can generate a constant gradient can be used. The magnet or magnets can be portable or non-portable. Methods according to other embodiments of the present invention can be used with a prior art MRI set-up.

The present inventors have shown that portable NMR can be used for dynamic mechanical analysis of well-characterized viscoelastic samples undergoing bulk-longitudinal excitation. Velocity waveforms can be acquired by synchronizing the NMR acquisition with the vibrations and measuring the phase at the peak of the echo at points along the vibration period. Velocity waveforms yield information on the viscoelasticity of the sample through the loss-angle and magnitude of the dynamic modulus that closely follow the expected behavior. Closer agreement with expected values is possible if shear components can be reduced; this may be possible with better control over sample geometry and through the use longer samples.

To demonstrate potential biomedical applications, shear forces should be used in the testing of softer, water-based samples resembling biological tissues. The gradient-independent analysis of diffusive attenuation allows for echo times and velocities to be selected based on the sample's diffusion coefficient to limit over-attenuation of the signal and phase wrapping.

Acquisition of multiple echoes can be useful when investigating samples with higher $T_1$ and $T_2$ relaxation times, provided that stimulated echoes superimposed onto spin echoes can be eliminated. Driving samples with complex waveforms can allow for the excitation of multiple frequencies in a single measurement, demonstrating the potential of Fourier Transform Mechanical Spectroscopy with portable NMR.

The simplicity of this approach allows for the testing of different samples and methods of excitation with relative ease in the sense of the NMR measurement, the sole requirement being an oscillating force in the direction of the constant gradient. Along with shear excitation, acquiring spatial resolution further demonstrates the potential of elastography with portable NMR. These are logical directions in which to proceed to meet the long-term objective of developing a more portable and cost-effective MRE technique.

One or more methods described herein (e.g., method 200) can be implemented by computer program instructions or code, which can be executed on a computer. For example, the code can be implemented by one or more digital processors (e.g., microprocessors or other processing circuitry), and can be stored on a computer program product including a non-transitory computer-readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc.

The program instructions can also be contained in, and provided as an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processing units (or GPUs) Application Specific Integrated Circuits (ASICs), and the like. One or more methods can be performed as part of or component of an application running on the system, or as an application or software running in conjunction with other applications and operating system.

One or more methods described herein can be run as a program in an NMR device or as a standalone program connected to an NMR device. Although the description has been described with respect to particular implementations thereof, these particular implementations are merely illustrative, and not restrictive. Concepts illustrated in the examples may be applied to other examples and implementations. Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines and processing of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

While the teaching herein includes illustrative embodiments and examples of some aspects of an invention, the description is not intended to be construed in a limiting sense. Thus, various modifications of the illustrative embodiments, as well as other embodiments of the invention, may be apparent to persons skilled in the art upon reference to this description. It is therefore contemplated that the appended claims will cover any such modifications or embodiments.

REFERENCES

[1] K. P. Menard, N. R. Menard, Dynamic Mechanical Analysis, CRC Press, 2020. doi: 10.1201/9780429190308.

[2] S. K. Venkatesh, M. Yin, R. L. Ehman, Magnetic resonance elastography of liver: Technique, analysis, and clinical applications, Journal of Magnetic Resonance Imaging 37 (3) (2013) 544-555. doi: 10.1002/jmri.23731.

[3] J. Ophir, I. C'espedes, H. Ponnekanti, Y. Yazdi, X. Li, Elastography: A quantitative method for imaging the elasticity of biological tissues, Ultrasonic Imaging 13 (2) (1991) 111-134. doi: https://doi.org/10.1016/0161-7346 (91) 90079-W.

[4] R. Muthupillai, D. J. Lomas, P. J. Rossman, J. F. Greenleaf, A. Manduca, R. L. Ehman, Magnetic resonance elastography by direct visualization of propagating acoustic strain waves, Science 269 (5232) (1995) 1854-1857. doi: 10.1126/science.7569924.

[5] H. Li, G. Fle, M. Bhatt, Z. Qu, S. Ghazavi, L. Yazdani, G. Bosio, I. Rafati, G. Cloutier, Viscoelasticity imaging of biological tissues and single cells using shear wave propagation, Frontiers in Physics 9 (2021). doi: 10.3389/fphy.2021.666192.

[6] B. Blu mich, P. Blümler, G. Eidmann, A. Guthausen, R. Haken, U. Schmitz, K. Saito, G. Zimmer, The NMR-mouse: construction, excitation, and applications, Magnetic Resonance Imaging 16 (5-6) (1998) 479-484. doi: 10.1016/s0730-725x (98) 00069-1.

[7] F. Casanova, J. Perlo, B. Blümich, Single-Sided NMR, Springer Berlin Heidelberg, 2011. doi: 10.1007/978-3-642-16307-4.

[8] I. Mastikhin, M. Barnhill, Sensitization of a stray-field NMR to vibrations: A potential for MR elastometry with a portable NMR sensor, Journal of Magnetic Resonance 248 (2014) 1-7. doi: 10.1016/j.jmr.2014.09.003.

[9] C. S. Tan, A. E. Marble, Y. Ono, Magnetic resonance elastometry using a single-sided permanent magnet, Measurement Science and Technology 23 (4) (2012) 045703. doi: 10.1088/0957-0233/23/4/045703.

[10] J. C. Garcia-Naranjo, I. V. Mastikhin, B. G. Colpitts, B. J. Balcom, A unilateral magnet with an extended constant magnetic field gradient, Journal of Magnetic Resonance 207 (2) (2010) 337-344. doi: 10.1016/j.jmr.2010.09.018.

[11] J. Mispelter, M. Lupu, A. Briguet, NMR Probeheads for Biophysical and Biomedical Experiments, IMPERIAL COLLEGE PRESS, 2015.

[12] D. G. Nishimura, Principles of Magnetic Resonance Imaging, Selfpublished, 2010.

[13] H. T. Fabich, P. Nandi, H. Thomann, M. S. Conradi, Diffusion measurements using the second echo, Concepts in Magnetic Resonance Part A 47A (2018) e21462. doi: 10.1002/cmr.a.21462.

[14] J. Ferry, Viscoelastic properties of polymers, Wiley, New York, 1980.

[15] T. Hall, M. Bilgen, M. Insana, T. Krouskop, Phantom materials for elastography, IEEE Transactions on Ultrasonics, Ferroelectrics and Frequency Control 44 (6) (1997) 1355-1365. doi: 10.1109/58.656639.

[16] R. A. Toupin, Saint-venant's principle, Archive for Rational Mechanics and Analysis 18 (2) (1965) 83-96. doi: 10.1007/bf00282253.

[17] E. E. Holly, S. K. Venkataraman, F. Chambon, H. H. Winter, Fourier transform mechanical spectroscopy of viscoelastic materials with transient structure, Journal of Non-Newtonian Fluid Mechanics 27 (1) (1988) 17-26. doi: 10.1016/0377-0257 (88) 80002-8.

[18] A. Y. Malkin, On the optimal form of a signal in fourier transform mechanical spectroscopy, Rheologica Acta 43 (1) (2004) 1-5. doi: 10.1007/s00397-003-0310-2.

[19] A. Brandt, Noise and vibration analysis: signal analysis and experimental procedures, John Wiley & Sons, 2011.

[20] R. Pintelon, J. Schoukens, Real-time integration and differentiation of analog signals by means of digital filtering, IEEE Transactions on Instrumentation and Measurement 39 (6) (1990) 923-927. doi: 10.1109/19.65799.

[21] A. Brandt, R. Brincker, Integrating time signals in frequency domain-comparison with time domain integration, Measurement 58 (2014) 511-519. doi: 10.1016/j.measurement.2014.09.004.

We claim:

1. A method of dynamic mechanical analysis of a sample comprising:
   providing a magnet to generate a constant gradient where at least a portion of the sample is in the constant gradient;
   inducing a vibration in the sample in the direction of the constant magnetic field gradient, the vibration comprising a vibration waveform and a vibration period;

generating an nuclear magnetic resonance (NMR) pulse sequence comprising at least two pulses with a delay between the pulses;

acquiring echos from the pulse sequence at multiple points along the vibration period;

measuring the phase of the NMR signal at each of the acquired echos;

using the phase of the NMR signal to measure the velocity of the vibration at the multiple points where the echos are acquired;

using the velocity measurements to acquire a velocity waveform; and using the velocity waveform and processing the velocity waveform to extract the loss angle and the magnitude of the dynamic modulus of the sample.

2. The method of claim 1, wherein the vibration waveform is an sinusoidal waveform.

3. The method of claim 1, wherein the vibration waveform is a complex waveform.

4. The method of claim 1, wherein the pulse sequence is synchronized with the vibration.

5. The method of claim 1, wherein the echo time is shorter than the vibration period.

6. The method of claim 1, wherein the magnet is a unilateral magnet.

7. The method of claim 1, wherein the magnet is a portable magnet.

8. The method of claim 1, wherein the phase is measured at the peak of each echo.

9. The method of claim 1, wherein the motion induced phase at the first echo is determined by using the equation:

$$\phi(2\tau) = -\phi(\tau) + \gamma Gv \int_{\tau}^{2\tau} t\,dt = \gamma Gv\tau^2$$

where y is the gyromagnetic ratio, G is the magnetic field gradient and v is the average velocity in the slice over the echo time.

10. The method of claim 1, wherein the sample is a human tissue sample.

11. The method of claim 1, wherein the sample is a polymer.

12. The method of claim 1, wherein the sample is a food.

* * * * *